United States Patent
Shimizu (10) Patent No.: US 10,048,364 B2
(45) Date of Patent: Aug. 14, 2018

(54) RADAR APPARATUS

(71) Applicant: Furuno Electric Co., Ltd., Nishinomiya (JP)

(72) Inventor: Akinori Shimizu, Osaka (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 435 days.

(21) Appl. No.: 15/048,138

(22) Filed: Feb. 19, 2016

(65) Prior Publication Data

US 2016/0245908 A1 Aug. 25, 2016

(30) Foreign Application Priority Data

Feb. 23, 2015 (JP) ................................. 2015-032630

(51) Int. Cl.
| | |
|---|---|
| *G01S 13/30* | (2006.01) |
| *G01S 13/28* | (2006.01) |
| *G01S 13/89* | (2006.01) |
| *G01S 13/22* | (2006.01) |
| *G01S 13/10* | (2006.01) |

(52) U.S. Cl.
CPC ............ *G01S 13/30* (2013.01); *G01S 13/106* (2013.01); *G01S 13/225* (2013.01); *G01S 13/28* (2013.01);
(Continued)

(58) Field of Classification Search
CPC ...... G01S 13/30; G01S 13/282; G01S 13/931; G01S 13/28; G01S 1/02; G01S 7/282;
(Continued)

(56) References Cited

U.S. PATENT DOCUMENTS 9,157,985 B1 * 10/2015 Tardif ..................... G01S 7/021
9,683,842 B2 * 6/2017 Giacotto .................. G01C 3/08
(Continued)

FOREIGN PATENT DOCUMENTS

| | | |
|---|---|---|
| EP | 2677341 A1 | 12/2013 |
| JP | 2008527391 A | 7/2008 |

(Continued)

OTHER PUBLICATIONS

European Patent Office, Extended European Search Report Issued in Application No. 16156471.1, dated Jul. 12, 2016, Germany, 5 pages.

*Primary Examiner* — Olumide Ajibade Akonai
(74) *Attorney, Agent, or Firm* — Alleman Hall Creasman & Tuttle LLP (57) ABSTRACT

A radar apparatus is provided. The radar apparatus includes a transmission and reception unit configured to transmit a close distance pulse signal, a medium distance pulse signal, and a far distance pulse signal in an order of the close distance pulse signal, the far distance pulse signal, the medium distance pulse signal, and then the far distance pulse signal, and receive reflection waves of the transmitted pulse signals, the far distance pulse signal having a wider pulse width than the close distance pulse signal, the medium distance pulse signal having a pulse width wider than the close distance pulse signal and narrower than the far distance pulse signal, and a signal processor configured to generate a radar image by using a first detection result and a second detection result.

20 Claims, 5 Drawing Sheets

(52) U.S. Cl.
CPC ............ *G01S 13/282* (2013.01); *G01S 13/89* (2013.01); *G01S 13/227* (2013.01)

(58) Field of Classification Search
CPC .... G01S 13/106; G01S 13/225; G01S 15/102; G01S 7/28; G01S 13/284; G01S 13/89; G01S 15/104; G01S 13/12
See application file for complete search history.

(56) References Cited

U.S. PATENT DOCUMENTS

| | | | |
|---|---|---|---|
| 2006/0220951 A1* | 10/2006 | Thome | G01S 7/288 342/174 |
| 2008/0018526 A1 | 1/2008 | Wade | |
| 2008/0136704 A1* | 6/2008 | Chan | G01S 7/282 342/201 |
| 2010/0207806 A1* | 8/2010 | Takahashi | G01S 13/106 342/109 |
| 2010/0225525 A1 | 9/2010 | Takase et al. | |
| 2011/0150053 A1* | 6/2011 | Kim | G01S 7/021 375/219 |
| 2011/0187579 A1 | 8/2011 | Asada et al. | |
| 2016/0054437 A1* | 2/2016 | Lilburn | G01S 7/282 342/21 |

FOREIGN PATENT DOCUMENTS

| | | |
|---|---|---|
| JP | 5398306 B2 | 1/2014 |
| WO | 2006123084 A1 | 11/2006 |

\* cited by examiner

RADAR APPARATUS

CROSS-REFERENCE TO RELATED APPLICATION(S)

This application claims priority under 35 U.S.C. § 119 to Japanese Patent Application No. 2015-032630, which was filed on Feb. 23, 2015, the entire disclosure of which is hereby incorporated by reference.

TECHNICAL FIELD

This disclosure mainly relates to a radar apparatus, which transmits pulse signals having different pulse widths to detect a target object within a surrounding area of the radar apparatus.

BACKGROUND

Conventionally, pulse-compression radars are known, which transmit pulse signals, receive reflection waves thereof, and perform a pulse compression on the reflection waves, so as to improve distance resolution and S/N (signal-to-noise ratio). In the case of transmitting the pulse signals having the wide pulse width, since the reflection waves cannot be received while the pulse signals are transmitted, a target object within a close distance cannot be detected. Therefore, pulse signals having a narrow pulse width may be transmitted additionally in order to detect target objects within the close distance. JP2008-527391A and JP5398306B disclose radar apparatuses of such a kind.

The radar apparatus of JP2008-527391A transmits a set of a short pulse signal for close distance, a medium pulse signal for medium distance, and a long pulse signal for far distance. The short pulse signal is a non-modulated pulse and the medium and long pulse signals are modulated pulses.

The radar apparatus of JP5398306B, similar to JP2008-527391A, transmits pulse signals having three kinds of pulse widths. This radar apparatus stores a given number of reception data for each of the three kinds of pulse signals (i.e., for each detectable distance). This radar apparatus performs a pulse integration of the given number of reception data by using FFT (Fast Fourier Transform), DFT (Discrete Fourier Transform), etc., for each of the three kinds of pulse signals. Thus, the S/N can be improved.

However, in the case of transmitting the pulse signals having the three kinds of pulse widths in order as JP2008-527391A and JP5398306B, a transmission time interval between the pulse signals with the same pulse width becomes long. Especially since the pulse signals are transmitted from the radar apparatus at a given angle interval in a bearing direction, space between the pulse signals in the bearing direction becomes wider as they propagate farther from the radar apparatus. Therefore, with the long transmission time interval between the pulse signals for far distance detection, the pulse signals may not meet a target object within a far distance range. In this case, the target object within the far distance range is not detected and/or the S/N does not improve much even by performing the pulse integration.

SUMMARY

The purpose of this disclosure relates to providing a radar apparatus, which is capable of transmitting a plurality of kinds of pulse signals having different pulse widths, and particularly capable of accurately detecting a target object within a far distance range.

According to one aspect of the present disclosure, a radar apparatus is provided. The radar apparatus includes a transmission and reception unit configured to transmit a close distance pulse signal, a medium distance pulse signal, and a far distance pulse signal in an order of the close distance pulse signal, the far distance pulse signal, the medium distance pulse signal, and then the far distance pulse signal, and receive reflection waves of the transmitted pulse signals, the far distance pulse signal having a wider pulse width than the close distance pulse signal, the medium distance pulse signal having a pulse width wider than the close distance pulse signal and narrower than the far distance pulse signal, and a signal processor configured to generate a radar image by using a first detection result and a second detection result, the first detection result being a result of the transmissions and the receptions of the close distance pulse signal and the far distance pulse signal transmitted subsequently to the close distance pulse signal, the second detection result being a result of the transmissions and the receptions of the medium distance pulse signal and the far distance pulse signal transmitted subsequently to the medium distance pulse signal.

With this configuration, since the far distance pulse signal is used to obtain both the first and second detection results, a transmission time interval of the far distance pulse signal can be shortened. Therefore, a target object within a far distance range can accurately be detected.

In the first detection result, a first undetectable range for which a detection result is not obtained may exist between a distance range for which the transmission and reception of the close distance pulse signal is performed and a distance range for which the transmission and reception of the far distance pulse signal is performed.

With this configuration, the first detection result sufficiently focusing on particular ranges (close and far distance ranges) can be obtained.

A distance range for which the transmission and reception of the medium distance pulse signal is performed may at least partially overlap with the first undetectable range.

With this configuration, the range for which the detection result is not obtained in the first detection result can be interpolated by the second detection result.

The first undetectable range may be interpolated by using the detection result obtained with the medium distance pulse signal.

With this configuration, the first detection result can be interpolated by the second detection result which is obtained from a bearing close to that from which the first detection result is obtained.

In the second detection result, a second undetectable range for which a detection result is not obtained may exist within a closer distance range than a distance range for which the transmission and reception of the medium distance pulse signal is performed, and a distance range for which the transmission and reception of the close distance pulse signal is performed may at least partially overlap with the second undetectable range.

With this configuration, the second detection result sufficiently focusing on particular ranges (medium and far distance ranges) can be obtained. Moreover, the range for which the detection result is not obtained in the second detection result can be interpolated by the first detection result.

The second undetectable range may be interpolated by using the detection result obtained with the close distance pulse signal.

With this configuration, the second detection result can be interpolated by the first detection result which is obtained from a bearing close to that from which the second detection result is obtained.

The close distance pulse signal may be a non-modulated pulse, and the medium and far distance pulse signals may be modulated pulses.

With this configuration, since the pulse widths of the medium and far distance pulse signals are wide, a pulse compression can suitably be performed by modulation.

Frequency modulation widths of the medium and far distance pulse signals may be the same.

With this configuration, the medium and far distance pulse signals have the same pulse width after being compressed, and thus, detection results of the medium and far distance ranges can be synthesized so that a boundary therebetween becomes unapparent.

Pulse widths and frequency modulation widths of the far distance pulse signal used to obtain the first detection result and the far distance pulse signal used to obtain the second detection result may be the same.

With this configuration, the first and second detection results can be synthesized so that a boundary therebetween becomes unapparent.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Figure 1:
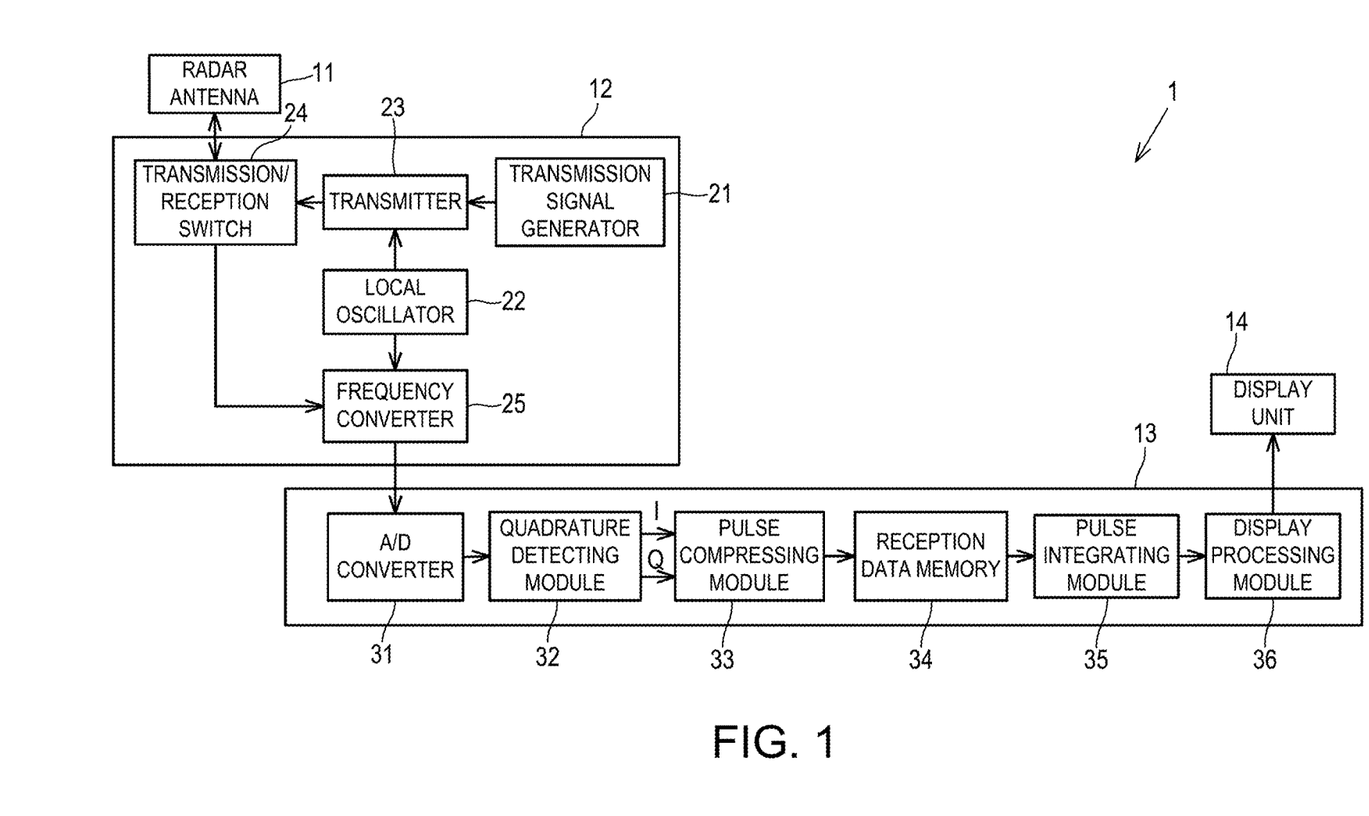
FIG. 1 is a block diagram illustrating a configuration of a radar apparatus according to one embodiment of the present disclosure.
Figure 2:
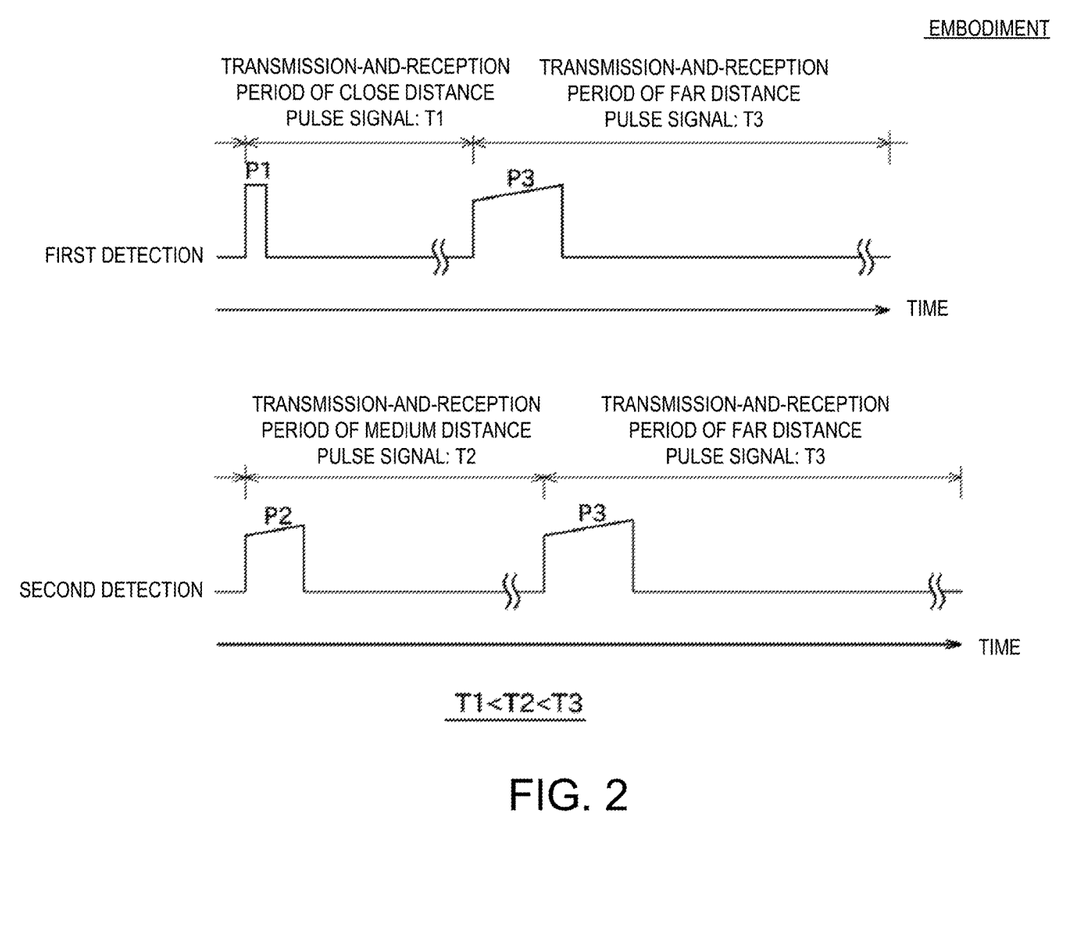
FIG. 2 illustrates a chart of a waveform and transmission-and-reception periods of pulse signals transmitted in a first detection and a chart of a waveform and transmission-and-reception periods of pulse signals transmitted in a second detection.
Figure 3:
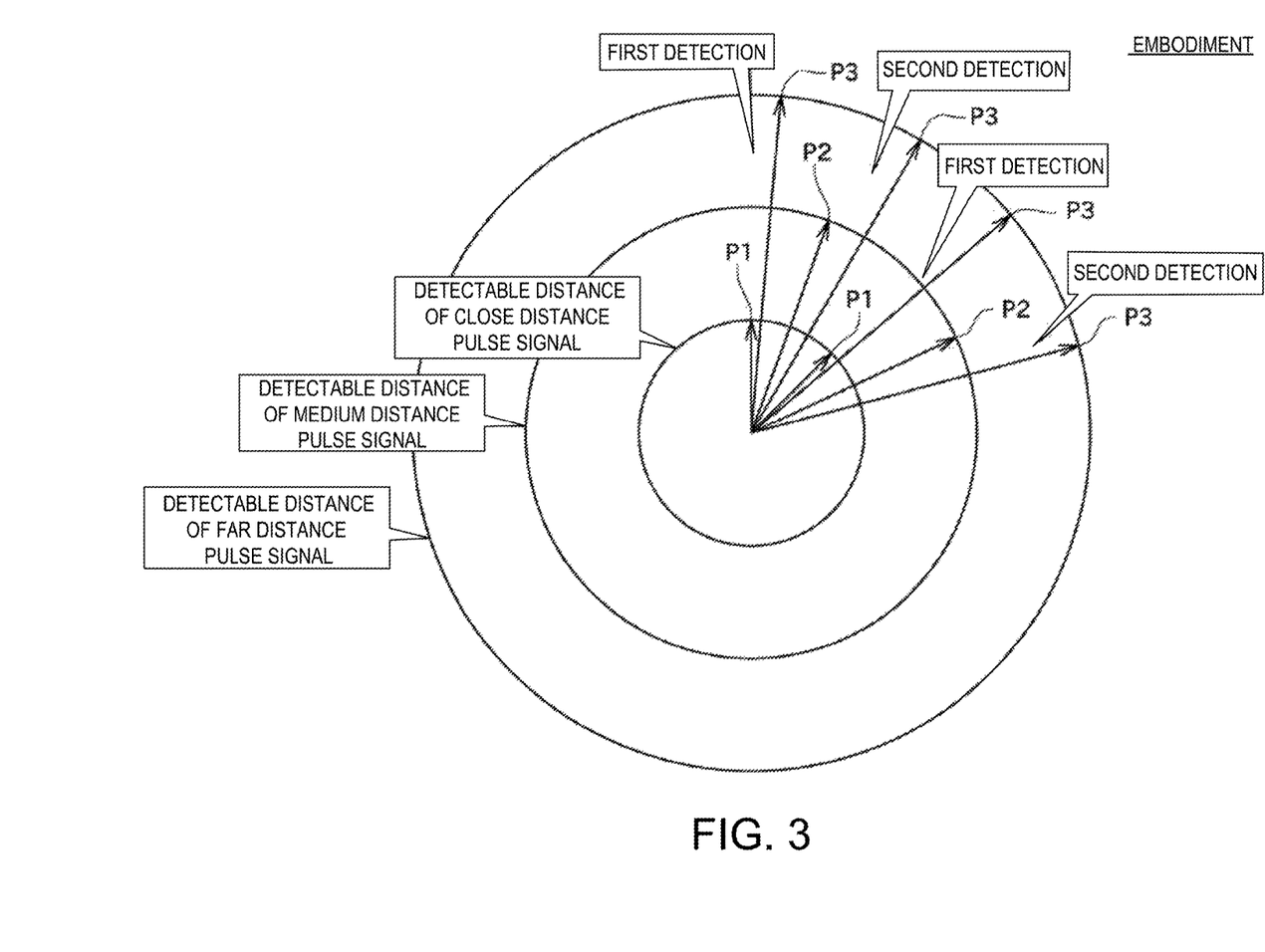
FIG. 3 is a view illustrating directions and detectable distances of the pulse signals transmitted in the first and second detections.

Next, one embodiment of the present disclosure is described with reference to the accompanying drawings. In the following embodiment, an example is illustrated in which the present disclosure is applied to a ship. However, the present disclosure may be applied to any kinds of vehicles having a rudder or a similar steering device, such as other watercrafts including boats, vessels, and submarines, as well as land vehicles, airplanes and spaceships. FIG. 1 is a block diagram illustrating a configuration of a radar apparatus 1 according to this embodiment of this disclosure. FIG. 2 illustrates a chart of a waveform and transmission-and-reception periods of pulse signals transmitted in a first detection and a chart of a waveform and transmission-and-reception periods of pulse signals transmitted in a second detection. FIG. 3 is a view illustrating directions and detectable distances of the pulse signals transmitted in the first and second detections.

The radar apparatus 1 of this embodiment is a pulse-compression radar. The radar apparatus 1 transmits radio waves having a wide pulse width and analyzes reception signals caused by the transmitted radio waves, so as to detect a position and a speed of a target object.

As illustrated in FIG. 1, the radar apparatus 1 includes a radar antenna 11, a transmission and reception unit 12, a signal processor 13, and a display unit 14.

The radar antenna 11 transmits a microwave configuring a transmission signal and receives echo(es) (reception signal(s), reflection signal(s)) from target object(s) in a surrounding area of the radar antenna 11. The radar antenna 11 repeats the transmission and reception while rotating on a particular plane at a given cycle. Thus, the radar apparatus 1 is capable of detecting target object(s) in a surrounding area of a ship concerned (hereinafter, referred to as "the ship").

The transmission and reception unit 12 includes a transmission signal generator 21, a local oscillator 22, a transmitter 23, a transmission/reception switch 24, and a frequency converter 25. Note that the transmission and reception unit 12 may be disposed inside the radar antenna 11 or at a radar indicator.

The transmission signal generator 21 specifies a pulse width, a modulation mode (a frequency modulation width and a frequency change mode), etc., and generates a microwave having a given waveform. The local oscillator 22 generates a local signal for converting the microwave generated by the transmission signal generator 21 into a given band range. The transmitter 23 generates the transmission signal based on the microwave generated by the transmission signal generator 21 and the local signal and outputs the transmission signal to the transmission/reception switch 24.

The transmission/reception switch 24 switches the transmission and the reception of the microwave therebetween. Specifically, to externally transmit the transmission signal, the transmission/reception switch 24 outputs the transmission signal outputted by the transmitter 23 to the radar antenna 11. On the other hand, to externally receive the reception signal, the transmission/reception switch 24 outputs the reception signal from the radar antenna 11 to the frequency converter 25.

FIG. 2 schematically illustrates the transmission signals transmitted by the radar antenna 11 of this embodiment. As illustrated in FIGS. 2 and 3, the radar apparatus 1 alternately executes first and second detections. Note that FIG. 3 illustrates the transmission time intervals of the pulse signals to be longer than actual intervals for the sake of convenience. Further in FIG. 3, the three circles indicate, from the inside, a detectable distance of a pulse signal for close distance range (close distance pulse signal) P1, a detectable distance of a pulse signal for medium distance range (medium distance pulse signal) P2, and a detectable distance of a pulse signal for far distance range (far distance pulse signal) P3. Note that these detectable distances are also illustrated with different lengths from actual detectable distances for the sake of convenience.

The first detection includes transmission and reception processings of the close distance pulse signal P1 and transmission and reception processings of the far distance pulse signal P3. The second detection includes transmission and reception processings of the medium distance pulse signal P2 and transmission and reception processings of the far distance pulse signal P3.

The close distance pulse signal P1 is a signal for detecting a close distance range. The close distance pulse signal P1 is a non-modulated pulse and has the narrowest pulse width among the three pulse signals.

The medium distance pulse signal P2 is a signal for detecting a medium distance range (between the close distance range and the far distance range). The medium distance pulse signal P2 is a modulated pulse. The pulse width of the medium distance pulse signal P2 is wider than the close distance pulse signal P1 and narrower than the far distance pulse signal P3.

The far distance pulse signal P3 is a modulated pulse and has the widest pulse width among the three pulse signals. Further the medium and far distance pulse signals P2 and P3 have the same frequency modulation width. Thus, they will have the same pulse width after a pulse compression (described later). Note that the frequency change mode may be linear or non-linear. Moreover, the far distance pulse signal P3 is used in both of the first and second detections, and the properties (pulse width, modulation mode, amplitude, etc.) of the far distance pulse signal P3 are the same therein.

With the close distance pulse signal P1, since the pulse width is narrow and the purpose of using the signal P1 is to receive a reflection wave from a target object within the close distance range, a waiting time length for the reception is short. Therefore, a transmission-and-reception period T1 of the close distance pulse signal P1 is the shortest period among those of the three pulse signals. With the medium distance pulse signal P2, since the pulse width is wider than the close distance pulse signal P1 and a waiting time for the reception lasts until a reflection wave from a target object within the medium distance range is received, a transmission-and-reception period T2 of the medium distance pulse signal P2 is longer than T1. Similarly, a transmission-and-reception period T3 of the far distance pulse signal P3 is the longest period among those of the three pulse signals. Thus, a relationship of T1<T2<T3 is established.

The frequency converter 25 converts the reception signal into a baseband by using the local signal generated by the local oscillator 22. The reception signal converted by the frequency converter 25 is outputted to the signal processor 13.

The signal processor 13 includes an A/D converter 31, a quadrature detecting module 32, a pulse compressing module 33, a reception data memory 34, a pulse integrating module 35, and a display processing module 36.

The A/D converter 31 converts the reception signal from an analog signal into a digital signal from a single signal.

The quadrature detecting module 32 divides the inputted reception signal into two signal components and shifts a phase of one of the signal components by 90°. Thus, the quadrature detecting module 32 generates two signal components of an I signal and a Q signal.

The pulse compressing module 33 takes in the I and Q signals and compresses pulse widths thereof. Thus, even with a microwave which causes a weak output, reception data with substantially the same intensity as that obtained by a conventional magnetron radar can be obtained. Note that the pulse compressing module 33 performs different processing according to the inputted signal. For example, when the reception signal of the close distance pulse signal P1 is inputted, since the pulse compression is not required, no particular processing is performed. When the reception signal of the medium distance pulse signal P2 is inputted, the pulse width thereof is compressed in a mode according to the modulation mode of the medium distance pulse signal P2. The pulse width of the far distance pulse signal P3 is also similarly compressed.

The reception data memory 34 stores a given number of reception data generated by the pulse compressing module 33, for each distance range. Further, when the pulse compressing module 33 newly generates reception data (latest reception data), the reception data stored in the reception data memory 34 is replaced by the latest reception data. Note that, the reception data memory 34 may store a given number of reception data for each kind of pulse signal.

The pulse integrating module 35 performs a pulse integration based on the reception data stored by the reception data memory 34. Specifically, the pulse integrating module 35 performs the pulse integration of the given number of reception data by one of DFT and FFT, for each distance range. Thus, the pulse integrating module 35 can calculate a detection result. Note that the pulse integrating module 35 may perform the pulse integration for each kind of pulse signal.

The display processing module 36 generates a radar image (described later) based on the detection result outputted by the pulse integrating module 35.

Figure 4:
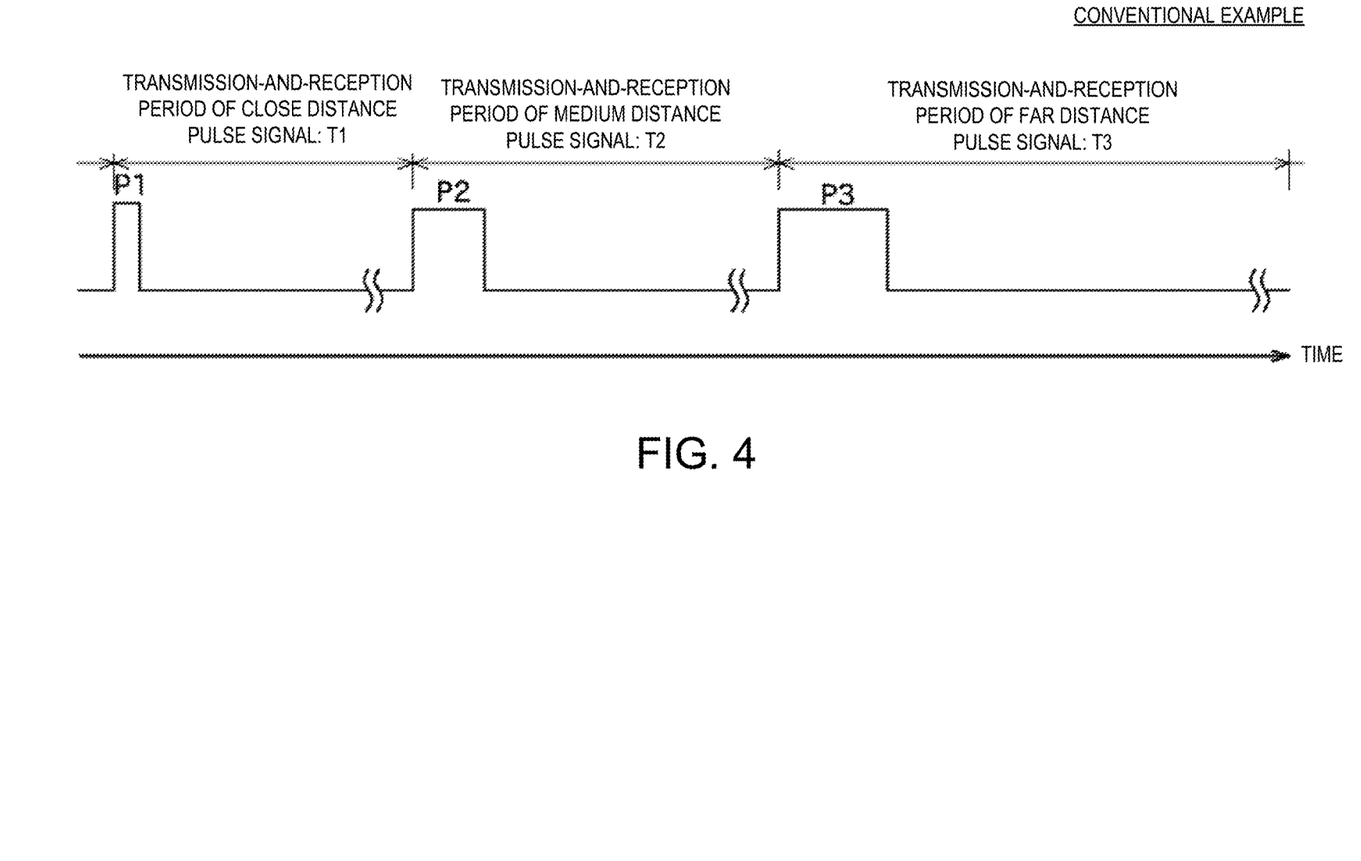
FIG. 4 is a chart illustrating pulse signals transmitted in a conventional example and transmission-and-reception periods thereof.

Next, characteristics of the pulse signals transmitted by the radar apparatus 1 of this embodiment are described with reference to FIGS. 2 to 4. FIG. 4 is a chart illustrating pulse signals transmitted in a conventional example (corresponding to JP2008-527391A and JP5398306B) and transmission-and-reception periods thereof.

First, the pulse signals transmitted according to JP2008-527391A and JP5398306B are briefly described. As illustrated in FIG. 4, in each of the conventional radar apparatuses, the transmission and reception processings for a close distance pulse signal P1, a medium distance pulse signal P2, and a far distance pulse signal P3 are performed in this order, and these processings are repeated. Therefore, each kind of pulse signal is transmitted every three transmissions.

Here, the pulse signals are radially transmitted by the radar apparatus, and thus, space between the pulse signals in the bearing direction becomes wider as they propagate farther from the radar apparatus. Therefore, the pulse signals may not meet a target object within the far distance range. In this case, the target object within the far distance range is not detected and/or the S/N does not improve much when the pulse integration is performed.

In this regard, in this embodiment, the far distance pulse signal P3 is transmitted in both of the first and second detections. In other words, the far distance pulse signal P3 is transmitted every other transmission. Therefore, compared to the conventional example in FIG. 4, the target object within the far distance range can accurately be detected.

Additionally in this embodiment, the close and medium distance pulse signals P1 and P2 are transmitted every four transmissions. However, the space between the pulse signals in the bearing direction does not become excessively wide within the close and medium distance ranges as described above. Therefore, the reflection waves can stably be acquired from a plurality of target objects compared to within the far distance range, and the radar apparatus 1 can detect within the surrounding area thereof without a problem.

Further with the conventional radar apparatus in FIG. 4, the transmission time interval of the far distance pulse signal P3 is always constant. Therefore, it is required to implement a measure to prevent interference with other radar apparatuses. In this regard, in this embodiment, since the transmission time interval of the far distance pulse signal P3 is one of T1 and T2, it is not constant. Therefore, interference with the other radar apparatuses can be prevented. Note that, in order to reduce the influence of the interference even more, the transmission time interval between the pulse signals may be slightly varied.

Figure 5:
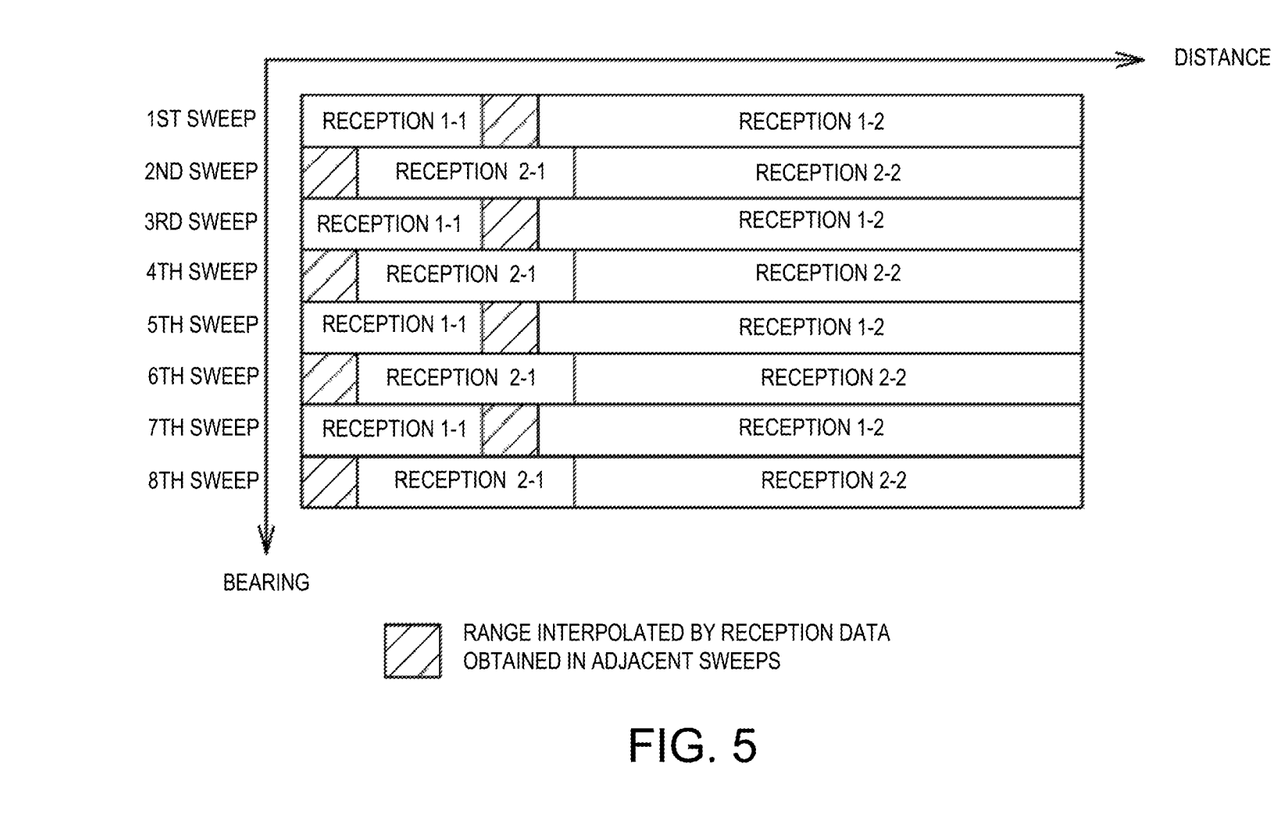
FIG. 5 is a chart illustrating ranges for which the first and second detections are performed.

Next, a method of generating the reception data and the radar image which can be obtained through the first and second detections is described with reference to FIG. 5. FIG. 5 illustrates ranges for which the first and second detections are performed. Note that in the following description, the processing of transmitting and receiving the series of (two) pulse signals in each of the first and second detections is referred to as a single sweep.

In (odd number)-th sweeps, the first detection is performed. In FIG. 5, "RECEPTION 1-1" indicates the reception data obtained with the close distance pulse signal P1 and "RECEPTION 1-2" indicates the reception data obtained with the far distance pulse signal P3. In the first detection, since the medium distance pulse signal P2 is not transmitted, an undetectable range (first undetectable range) exists between "RECEPTION 1-1" and "RECEPTION 1-2." Note that the first detection may be performed so that such an undetectable range does not exist between "RECEPTION 1-1" and "RECEPTION 1-2."

In (even number)-th sweeps, the second detection is performed. In FIG. 5, "RECEPTION 2-1" indicates the reception data obtained with the medium distance pulse signal P2 and "RECEPTION 2-2" indicates the reception data obtained with the far distance pulse signal P3. In the second detection, since the close distance pulse signal P1 is not transmitted, an undetectable range (second undetectable range) exists on a closer distance side of "RECEPTION 2-1." Note that the detectable distance range of the medium distance pulse signal (corresponding to "RECEPTION 2-1") at least partially overlaps with the first undetectable range. Further, the detectable distance range of the close distance pulse signal (corresponding to "RECEPTION 1-1") at least partially overlaps with the second undetectable range.

The first undetectable range is interpolated by the reception data obtained with the medium distance pulse signal P2 in the second detection ("RECEPTION 2-1"). Specifically, a detection result which would be obtained within the first undetectable range is estimated by performing average value processing on the reception data of the second detection performed immediately previous to and immediately after the first detection concerned. Note that, the interpolating method of the first undetectable range is arbitrary, and it may be such that the reception data obtained immediately previous to or immediately after the first detection concerned is used, or reception data for a plurality of adjacent second detections obtained immediately previous to or immediately after the first detection concerned may be used. Alternatively, the detection result which would be obtained within the first undetectable range may be estimated by performing the pulse integration using the above-described reception data obtained immediately previous to and/or immediately after the first detection concerned.

The second undetectable range is interpolated by the reception data obtained by the close distance pulse signal P1 in the first detection ("RECEPTION 1-1"). Specifically, a detection result which would be obtained within the second undetectable range is estimated by performing average value processing on the reception data of the first detection performed immediately previous to and immediately after the second detection concerned. Note that, the interpolating method of the second undetectable range is arbitrary, and various methods may be used similarly to the interpolating method of the first undetectable range.

Further, when interpolating the first and second undetectable ranges, a plurality of reception data adjacent to each other in the distance direction may be taken into consideration so that a mark of the interpolation performed does not appear on the radar image (a boundary between the interpolated section and the non-interpolated section becomes unapparent). Also between "RECEPTION 2-1" and "RECEPTION 2-2," the reception data may be processed smoothing so that a boundary of two reception data does not appear on the radar image. Particularly since the frequency modulation widths of the medium and far distance pulse signals P2 and P3 are the same as described above, a radar image with no obvious boundary between the medium and far distance ranges can be created. Note that since the properties of the far distance pulse signal P3 are the same in the first and second detections, processing of synthesizing the detection result of the far distance range in the first detection with the detection result of the far distance range in the second detection becomes easy, and also unbalanced illustration of the adjacent sections in the bearing direction in the radar image generated by the synthesizing can be eliminated.

As described above, the radar apparatus 1 includes the transmission and reception unit 12 and the signal processor 13. The transmission and reception unit 12 transmits the close distance pulse signal, the medium distance pulse signal, and the far distance pulse signal in the order of the close distance pulse signal, the far distance pulse signal, the medium distance pulse signal, and then the far distance pulse signal, and receives the reflection waves of the transmitted pulse signals, the far distance pulse signal having the wider pulse width than the close distance pulse signal, the medium distance pulse signal having the pulse width wider than the close distance pulse signal and narrower than the far distance pulse signal. The signal processor 13 generates the radar image by using a first detection result (the reception data obtained through the first detection) and a second detection result (the reception data obtained through the second detection), the first detection result being a result of the transmissions and the receptions of the close distance pulse signal and the far distance pulse signal transmitted subsequently to the close distance pulse signal, the second detection result being a result of the transmissions and the receptions of the medium distance pulse signal and the far distance pulse signal transmitted subsequently to the medium distance pulse signal.

Since the far distance pulse signal P3 is transmitted in both of the first and second detections, the transmission time interval of the far distance pulse signal P3 can be shortened. Therefore, the target object within the far distance range can accurately be detected.

Although one embodiment of the present disclosure is described above, the above configuration may be modified as follows.

In the above embodiment, the radar image is generated by performing the pulse integration; however, this may be omitted.

In the above embodiment, the radar apparatus mounted on the ship is described as an example; however, the present disclosure may be applied to radar apparatuses mounted on other movable bodies (e.g., aircrafts). Further, the present disclosure may be applied to radar apparatuses installed at a beacon, a strait, a port, etc., and having a configuration to detect a surrounding situation by radar echoes.

<Terminology>

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

The invention claimed is:

1. A radar apparatus, comprising:
   a transmission and reception unit configured to transmit a close distance pulse signal, a medium distance pulse signal, and a far distance pulse signal in an order of the close distance pulse signal, the far distance pulse signal, the medium distance pulse signal, and then the far distance pulse signal, and receive reflection waves of the transmitted pulse signals, the far distance pulse signal having a wider pulse width than the close distance pulse signal, the medium distance pulse signal having a pulse width wider than the close distance pulse signal and narrower than the far distance pulse signal; and
   a signal processor configured to generate a radar image by using a first detection result and a second detection result, the first detection result being a result of the transmissions and the receptions of the close distance pulse signal and the far distance pulse signal transmitted subsequently to the close distance pulse signal, the second detection result being a result of the transmissions and the receptions of the medium distance pulse signal and the far distance pulse signal transmitted subsequently to the medium distance pulse signal.

2. The radar apparatus of claim 1, wherein in the first detection result, a first undetectable range for which a detection result is not obtained exists between a distance range for which the transmission and reception of the close distance pulse signal is performed and a distance range for which the transmission and reception of the far distance pulse signal is performed.

3. The radar apparatus of claim 2, wherein a distance range for which the transmission and reception of the medium distance pulse signal is performed at least partially overlaps with the first undetectable range.

4. The radar apparatus of claim 3, wherein the first undetectable range is interpolated by using the detection result obtained with the medium distance pulse signal.

5. The radar apparatus of claim 1, wherein in the second detection result, a second undetectable range for which a detection result is not obtained exists within a closer distance range than a distance range for which the transmission and reception of the medium distance pulse signal is performed, and a distance range for which the transmission and reception of the close distance pulse signal is performed at least partially overlaps with the second undetectable range.

6. The radar apparatus of claim 2, wherein in the second detection result, a second undetectable range for which a detection result is not obtained exists within a closer distance range than a distance range for which the transmission and reception of the medium distance pulse signal is performed, and a distance range for which the transmission and reception of the close distance pulse signal is performed at least partially overlaps with the second undetectable range.

7. The radar apparatus of claim 3, wherein in the second detection result, a second undetectable range for which a detection result is not obtained exists within a closer distance range than a distance range for which the transmission and reception of the medium distance pulse signal is performed, and a distance range for which the transmission and reception of the close distance pulse signal is performed at least partially overlaps with the second undetectable range.

8. The radar apparatus of claim 4, wherein in the second detection result, a second undetectable range for which a detection result is not obtained exists within a closer distance range than a distance range for which the transmission and reception of the medium distance pulse signal is performed, and a distance range for which the transmission and reception of the close distance pulse signal is performed at least partially overlaps with the second undetectable range.

9. The radar apparatus of claim 5, wherein the second undetectable range is interpolated by using the detection result obtained with the close distance pulse signal.

10. The radar apparatus of claim 6, wherein the second undetectable range is interpolated by using the detection result obtained with the close distance pulse signal.

11. The radar apparatus of claim 7, wherein the second undetectable range is interpolated by using the detection result obtained with the close distance pulse signal.

12. The radar apparatus of claim 8, wherein the second undetectable range is interpolated by using the detection result obtained with the close distance pulse signal.

13. The radar apparatus of claim 1, wherein the close distance pulse signal is a non-modulated pulse, and the medium and far distance pulse signals are modulated pulses.

14. The radar apparatus of claim 11, wherein the close distance pulse signal is a non-modulated pulse, and the medium and far distance pulse signals are modulated pulses.

15. The radar apparatus of claim 12, wherein the close distance pulse signal is a non-modulated pulse, and the medium and far distance pulse signals are modulated pulses.

16. The radar apparatus of claim 13, wherein frequency modulation widths of the medium and far distance pulse signals are the same.

17. The radar apparatus of claim 14, wherein frequency modulation widths of the medium and far distance pulse signals are the same.

18. The radar apparatus of claim 15, wherein frequency modulation widths of the medium and far distance pulse signals are the same.

19. The radar apparatus of claim 1, wherein pulse widths and frequency modulation widths of the far distance pulse signal used to obtain the first detection result and the far distance pulse signal used to obtain the second detection result are the same.

20. The radar apparatus of claim 18, wherein pulse widths and frequency modulation widths of the far distance pulse signal used to obtain the first detection result and the far distance pulse signal used to obtain the second detection result are the same.

* * * * *